United States Patent Office 3,178,991
Patented Apr. 20, 1965

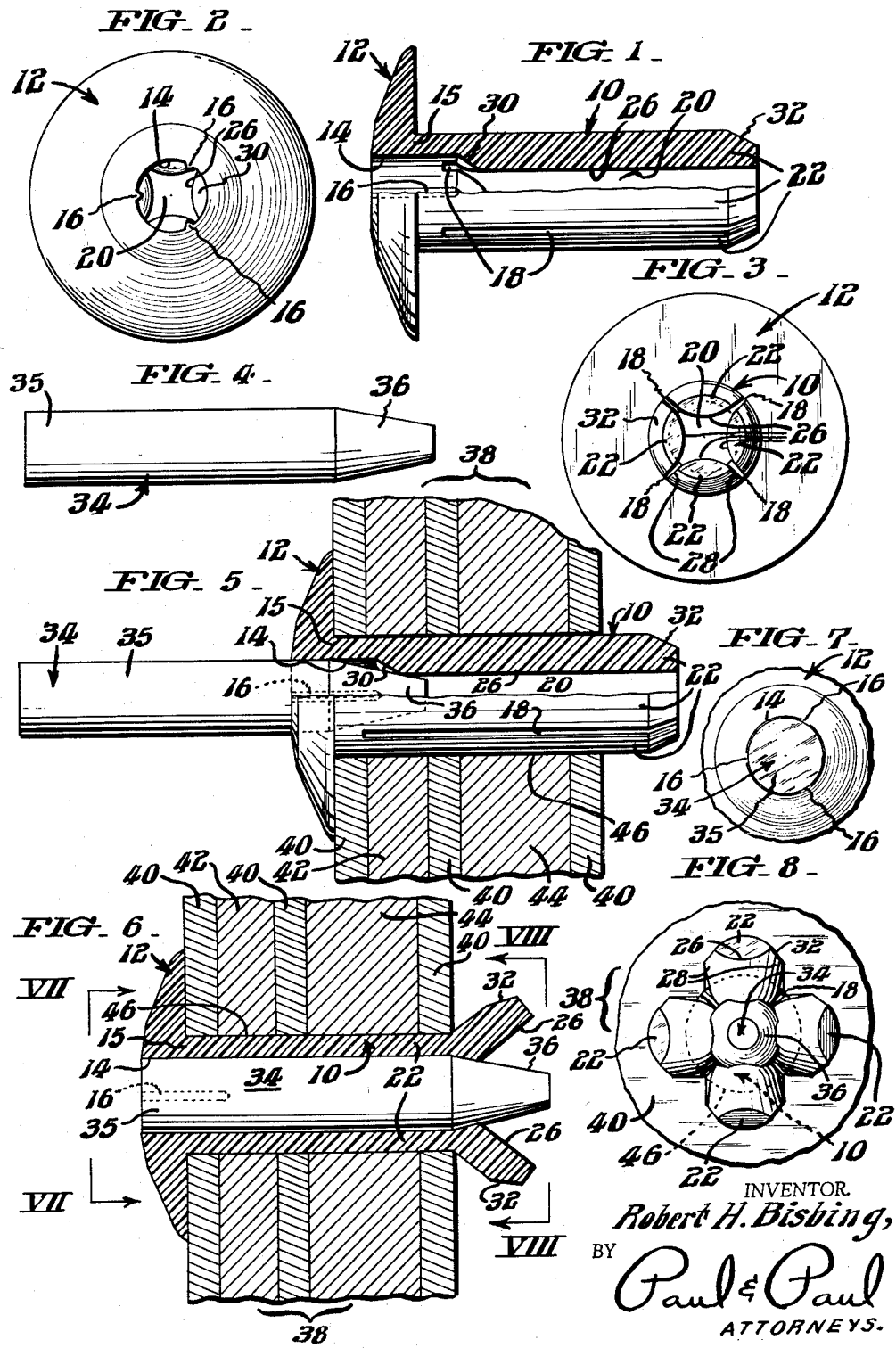

3,178,991
BLIND RIVET
Robert H. Bisbing, Upper Darby, Pa., assignor to South Chester Corporation, Lester, Pa., a corporation of Delaware
Filed Jan. 26, 1962, Ser. No. 168,888
1 Claim. (Cl. 85—84)

This invention relates generally to rivets, and particularly to improvements in rivets of the type which are set by an expander pin driven into the rivet.

It is sometimes necessary to fasten members of a device together by means of so-called blind rivets. For example, to fasten together a number of plate members when one side of the work is inaccessible, a blind rivet having a shank and a pre-formed head at one end is found to be useful. It is inserted shank first into a hole drilled through the plates. The end thereof protrudes on the inaccessible side of the work and is expanded to form a second head to hold the plates against the preformed head. Normally, expansion of the shank end to form a head requires a shank end especially shaped, as by upsetting, swaging, etc., to begin with, in consequence of which the range of work thickness that can be accommodated by a rivet with a shank of a given length is rather narrow. Accordingly, a principal object of the present invention is to provide a blind rivet with a shank having an end that may be expanded in place to form a head, without said shank end being especially shaped initially.

Another object is to provide such a rivet which will accommodate a wide range of work thicknesses.

Other objects of the invention will become apparent when the following description is read with reference to the accompanying drawing, in which:

FIG. 1 is a side view of a blind rivet, part being broken away and sectioned;

FIG. 2 is an end view looking at the head of the rivet shown in FIG. 1;

FIG. 3 is a view looking at the opposite end of the rivet shown in FIG. 1;

FIG. 4 is a side view of the expander pin;

FIG. 5 is a section showing the rivet applied to the work and about to be set;

FIG. 6 is similar to FIG. 5, but shows the rivet fully set; and

FIGS. 7 and 8 are views looking respectively at opposite ends of the rivet, as indicated respectively by the lines and arrows VII—VII and VIII—VIII in FIG. 6.

Referring to the drawing, the rivet comprises a part having a cylindrical shank 10 and a pre-formed button type head 12. The head 12 is provided with a central bore 14, which extends into the shank to form a cylindrical portion 15 immediately under the head 12. Disposed within the bore 14 are a set of three longitudinally and radially inwardly extending circumferentially equally spaced ribs 16. The shank portion extending in longitudinal continuation of the shank portion 15 is longitudinally slit, as at 18. The several slits 18 extend radially inwardly and communicate with a central opening 20, which opening communicates with the bore 14. The slits 18 divide the shank portion through which they extend into four prongs 22. The outer surfaces of the prongs 22 are longitudinal continuations of the cylindrical outer surface of the shank portion 15. Each prong 22 has an inwardly presenting convex surface comprising an arcuate portion 26 terminating at each side of the prong in tangential portions 28. The opposed surfaces 28 of adjacent prongs 22 feather radially outwardly and make the slits 18 very narrow. At the juncture of the prongs 22 with the shank portion 15 are radially tapered shoulders 30. The end of the shank 10 is axially tapered, as at 32.

It will be noted that the prongs 22 essentially are uniform in transverse section. The outside diameter of the shank 10 is slightly less than the outside diameter of the rivet hole which is formed in the work which is to receive the shank. The length of the shank is such that it will extend through the work and well beyond. Diametrically opposite prongs 22 are spaced a clear distance apart equal to substantially less than the diameter of the bore 14.

Referring particularly to FIG. 4, the expander pin 34 is provided with a body 35 having a diameter substantially equal to the diameter of the bore 14 and with an axially tapered nose, designated 36. Both rivet parts preferably are made of a thermoplastic material. In any event, the material of the expander pin is harder than the material of the rivet.

Referring particularly to FIG. 5, the work, generally designaed 38, comprises three plates 40, a plate 42, and a plate 44 stacked as shown. A hole for receiving the rivet is designated 46.

In the use of the rivet, from the accessible side of the work, the rivet is inserted shank first an inwardly presenting convex surface comprising an arcuate portion 26 terminating at each side of the prong in tangential portions 28. The opposed surfaces 28 of adjacent prongs 22 feather radially outwardly and make the slits 18 very narrow. At the juncture of the prongs 22 with the shank portion 15 are radially tapered shoulders 30. The end of the shank 10 is axially tapered, as at 32.

It will be noted that the prongs 22 essentially are uniform in transverse section. The outside diameter of the shank 10 is slightly less than the outside diameter of the rivet hole which is formed in the work which is to receive the shank. The length of the shank is such that it will extend through the work and well beyond. Diametrically opposite prongs 22 are spaced a clear distance apart equal to substantially less than the diameter of the bore 14.

Referring particularly to FIG. 4, the expander pin is provided with a body having a diameter substantially equal to the diameter of the bore 14 and with an axially tapered nose, designated 36. Both rivet parts preferably are made of a thermoplastic material. In any event, the material of the expander pin is harder than the material of the rivet.

Referring particularly to FIG. 5, the work, generally designated 38, comprises three plates 40, a plate 42, and a plate 44 stacked as shown. A hole for receiving the rivet is designated 46.

In the use of the rivet, from the accessible side of the work, the rivet is inserted shank first freely into the hole 46, the shank being of such a length that its leading end protrudes on the inaccessible side of the work. The expander pin is inserted tapered end first in the bore 14 and forced a short way thereinto (see FIG. 5). As the pin enters the bore, it crushes the three ribs 16 for a tight fit. Then the pin is hammered or otherwise driven fully into the shank. As it passes farther and farther into the shank, the prongs 22 are forced radially outwardly against the cylindrical surface of the hole 46. Having reached the limit of expansion radially outwardly, the material of the prongs then flows circumferentially about the pin so that the pin and the prongs conjointly substantially fill the hole 46. As the pin approaches its final position, the ends of the prongs, free of the constricting influence of the work, are bent radially outwardly and form an expanded second rivet head, as shown in FIGS. 6 and 8.

It should be noted that the maximum thickness of work accommodated by the rivet depends upon the total length of the shank and the length of the shank portion required to form the second or expanded head. Any thickness of work up to this maximum thickness may be accommodated by the rivet of the present invention because the shank is free of any special formation in the length thereof which is intended to be expanded to form the second rivet head. Referring to FIG. 6, if the total thickness of the work 38 were reduced, as by removing one of the plates 40, and if a rivet with a shank 10 (of the same length) were used, more of the shank would protrude on the inaccessible side of the work, i.e., the prong ends going into the expanded head would be longer, and the less the thickness of the work the longer the bent up prong ends.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claim.

Having thus described my invention, I claim as follows:

In combination, mutually overlying members of a predetermined thickness having a cylindrical rivet hole of predetermined uniform diameter extending therethrough, an expansible rivet made of thermoplastic material and projected through said rivet hole, and a pin for expanding said rivet whereby to completely fill said hole, said rivet including at least three longitudinally extending identical elements arcuately convexo-convex in transverse section disposed in close adjacent side-by-side relation to conjointly provide a cylindrical shank of a diameter substantially equal to the diameter of said hole and of a length to protrude beyond said members, said shank being uniform in transverse section throughout substantially the full length thereof, and being longitudinally slit between each adjacent pair of said elements, and said elements being spaced from the central axis of said rivet whereby to provide a passage through said shank, and a pre-formed head at one end of said shank, said pre-formed head being provided with a central bore of larger diameter than said passage and communicating with said passage, said pin being of a diameter larger than said passage for projection into said shank via said bore, expanding said shank radially into engagement with the cylindrical surface of said hole and expanding the end of said shank protruding beyond said members thereby to form a second head to hold said members against said pre-formed head, the sum of the transverse sectional areas of said elements and pin being at least as great as the transverse sectional area of said hole such that the latter is completely filled by the rivet and pin when the rivet is fully expanded.

References Cited by the Examiner

UNITED STATES PATENTS

| | | |
|---|---|---|
| 1,191,151 | 7/16 | Brush. |
| 1,452,514 | 4/23 | Karitzky. |
| 2,601,803 | 7/52 | Newman. |
| 2,759,390 | 8/56 | Edwards. |
| 2,968,207 | 1/61 | Flogaus. |

FOREIGN PATENTS 824,748   12/59   Great Britain.

EDWARD C. ALLEN, *Primary Examiner.*
CARL W. TOMLIN, *Examiner.*

UNITED STATES PATENT OFFICE
CERTIFICATE OF CORRECTION

Patent No. 3,178,991 April 20, 1965

Robert H. Bishing

It is hereby certified that error appears in the above numbered patent requiring correction and that the said Letters Patent should read as corrected below.

Column 2, line 17, for "designaed" read -- designated --; line 21, beginning with "an inwardly" strike out all to and including "inserted shank first" in line 49, same column 2.

Signed and sealed this 22nd day of February 1966.

(SEAL)
Attest:

ERNEST W. SWIDER
Attesting Officer

EDWARD J. BRENNER
Commissioner of Patents